United States Patent [19]

Lapeyre

[11] 3,941,238
[45] Mar. 2, 1976

[54] INTEGRAL HINGED FOOD CONVEYOR BELT CONSTRUCTION WITH LEVITATION MEANS

[75] Inventor: James M. Lapeyre, New Orleans, La.

[73] Assignee: The Laitram Corporation, New Orleans, La.

[22] Filed: July 16, 1974

[21] Appl. No.: 488,899

Related U.S. Application Data

[63] Continuation-in-part of Ser. No. 414,292, Nov. 9, 1973, abandoned.

[52] U.S. Cl. ............... 198/184; 198/202; 198/203
[51] Int. Cl.² ........................................ B65G 15/42
[58] Field of Search ........... 198/184, 202, 198, 193, 198/203

[56] References Cited
UNITED STATES PATENTS

| | | | |
|---|---|---|---|
| 2,832,228 | 4/1958 | Lorig | 198/202 |
| 3,245,518 | 4/1966 | Reibel et al. | 198/198 |
| 3,666,085 | 5/1972 | Folkes | 198/193 |
| 3,717,241 | 2/1973 | Arieh | 198/184 |
| 3,734,271 | 5/1973 | Dolgolenko et al. | 198/184 |

Primary Examiner—James B. Marbert
Attorney, Agent, or Firm—Wilkinson, Mawhinney & Theibault

[57] ABSTRACT

The present disclosure is directed to sanitary conveyor belts of polypropylene or other suitable plastic material having an integrally hinged construction defined by spaced notches which define the hinge points as well as drive engagement points between the belt and the sprockets having teeth which mate with the spaced notches. The belt construction also has one or more longitudinal notched grooves which defines a tracking and aligning groove which mates with a multi-faceted aligning member arranged polygonally about the perimeter of the sprockets which support the conveyor belt to preserve its alignment with the drive sprockets.

The conveyor belt is used with an air levitation means in the form of a plenum chamber having openings to direct low pressure air against the underside of the belt to reduce friction drag when the belt is loaded.

1 Claim, 8 Drawing Figures

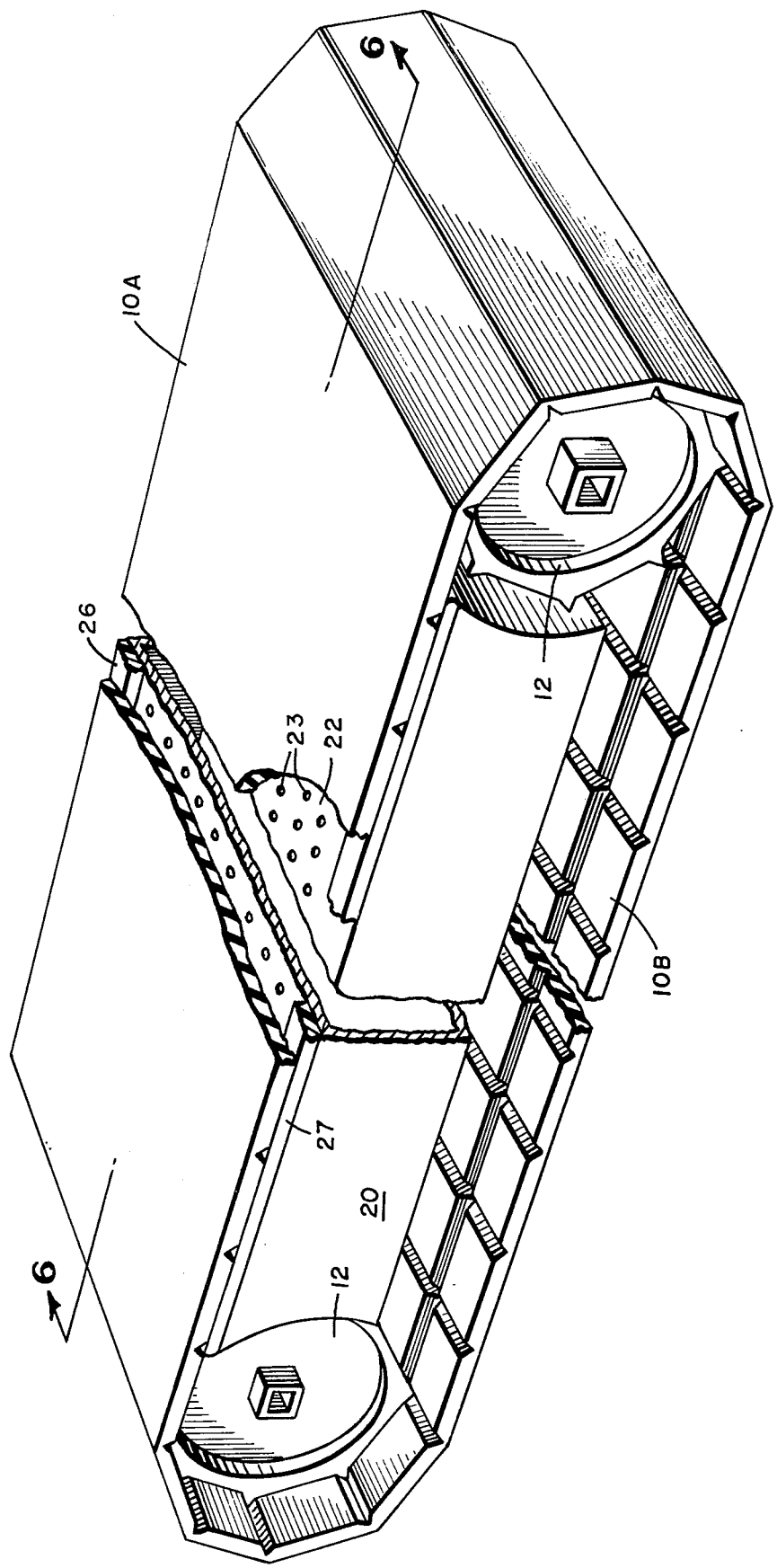

INTEGRAL HINGED FOOD CONVEYOR BELT CONSTRUCTION WITH LEVITATION MEANS

This application is a continuation-in-part of my similarly entitled application Ser. No. 414,292, filed Nov. 9, 1973 now abandoned.

An object of the present invention is to provide a sanitary food conveyor belt which may be made or formed of polypropylene or other suitable plastic and having integral hinge properties at underside notches which not only let the belt conform to the drive sprocket upon which it is supported but also define the mating drive connection with teeth on the sprockets to provide a positive drive.

A further object of the present invention is to provide a food conveyor belt as above described and constructed which also has at least one U or V-groove longitudinally of its under surface which forms a tracking groove to cooperate with a polygonal guide member about the perimeter of the sprockets supporting the belt to assure alignment of the belt relative to the sprockets and to maintain straight tracking of the belt.

A still further object of the present invention is to provide a food conveyor belt of the construction above described which due to its smooth unbroken top surface will be sanitary and easily cleaned and have a prolonged life in service expectancy due to the integral hinge properties of the polypropylene which is a tough light weight plastic having durability characteristics.

A further object of the present invention is to provide an air levitation system for the underside of the upper run of an endless conveyor belt of the character described above to reduce friction drag when the belt is loaded.

With the foregoing and other objects in view the invention will be more fully described hereinafter and more particularly pointed out in the appended claims.

In the drawings in which like parts are denoted by reference characters throughout the several views:

FIG. 8 is a perspective view with parts broken away and parts shown in section of an endless sanitary food conveyor belt similar to FIG. 1 with the plenum chamber shown below the upper run of the conveyor belt.

Figure 1:
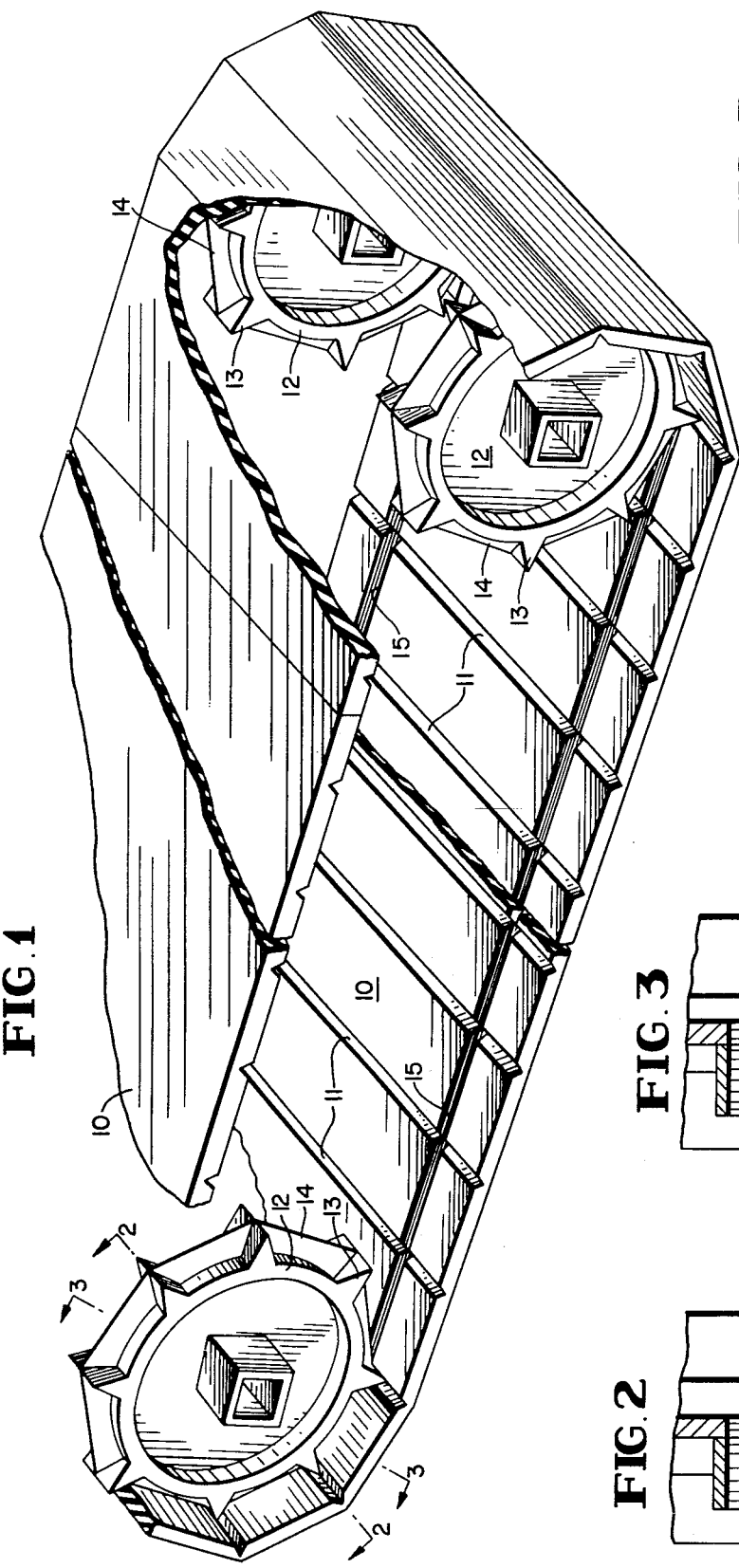
FIG. 1 is a perspective view with parts broken away and parts shown in section of an endless sanitary food conveyor belt and drive sprockets constructed in accordance with the present invention.
Figure 5:
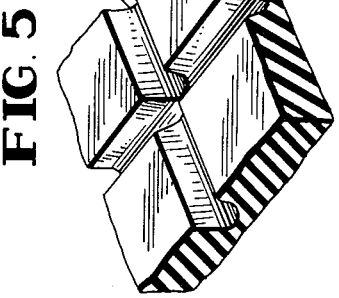
FIG. 5 is a fragmentary perspective view of a segment of belt construction showing a U or rounded cut which defines both the driving and aligning features of the invention.
Figure 4:
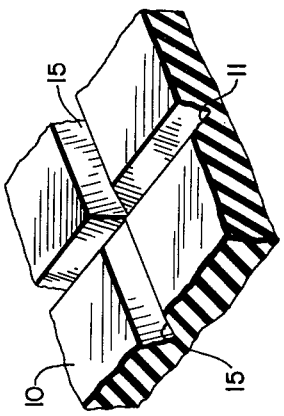
FIG. 4 is a fragmentary perspective view of a segment of belt construction showing the V cuts which define both the driving and aligning features of the invention.
Figure 3:
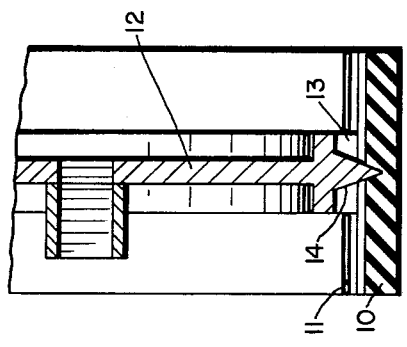
FIG. 3 is a vertical transverse section taken on the line 3—3 in FIG. 1.

Referring now more particularly to the drawings the belt construction consists of a plurality of lengths 10 of polypropylene material joined contiguously by a U or V joint 11 which define planes of weakness and which set forth the inherent integral hinge connections between adjacent lengths 10. The belt is formed into an endless shape either by fusion of joining in a manner well known in the art to define an endless belt configuration. The belt is supported upon and driven by sprockets 12 which have teeth 13 which run across the transverse width of the sprocket and which teeth are adapted to mesh within the U or V cuts 11 adjoining adjacent members 10. The sprockets are driven in a conventional manner and are shown in the present embodiment as being provided for rotation with a square shaft construction. The points of reduced thickness may be either linear or curvilinear.

Each end of the belt is supported by one or more sprockets 12 such that the teeth 13 mesh with the cutouts 11 to drive the food conveyor belt 10 in a continuous manner.

As best seen in FIG. 1 the sprocket 12 is provided with a polygonally raised member in the form of a triangular shaped guide 14. This triangular shaped polygonal or perimetral guide member 14 rides within and guides and controls the V groove 15 which run longitudinally of the conveyor belt underside and as best seen in FIG. 1 is at right angles to the V groove 11 which joins the contiguous hinge construction members 10.

Figure 2:
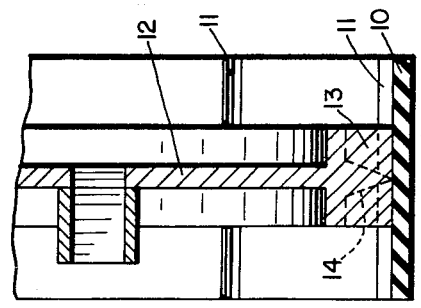
FIG. 2 is a vertical transverse section taken on the line 2—2 in FIG. 1.

As shown in FIG. 2 the sprocket 12 has toothed members 13 which run transversely across the width of the sprocket 12 and are compatable with and mesh with the notches 11 between continguous hinged adjoining segments 10 of the looped conveyor defining the invention disclosed herein.

The bending and confirmation of the endless loop or belt construction is assisted by the V notches 11 which permits the belts to perform a dual function of not only conforming to bending about the semi-perimeter of the sprocket 12 but also meshing with the triangular teeth 13 of the sprocket 12. The groove 15 running longitudinally internally of the belt provides a guide member which maintains the belt in proper alignment with the sprockets 12 upon which and over which the belt or loop is adapted to be supported and rotated.

Each length 10 is provided with a sprocket tooth engaging recess or cut 11 which is arranged to provide a driving connection between the lengths and the sprocket 12 on which they are mounted. Between the individual lengths there is a hinge area identified at the base of the notch 11 which consists of a molecularly oriented area of substantial strength and possessing the integral hinge feature characteristic of polypropylene.

The endless loop of belting shown in FIG. 1 defines a sanitary food belt construction which may be steam cleaned, washed or maintained in a clean sanitary condition with a minimum of effort and having a minimum of moving parts.

The hinge or notch 11 may be either rounded, like a U or it may be V-shaped. The teeth 13 and guide 14 may be either rounded, like a U or it may be V-shaped; however both the teeth and guide must be complemental geometrically to the notches 11 and 15.

Figure 6:
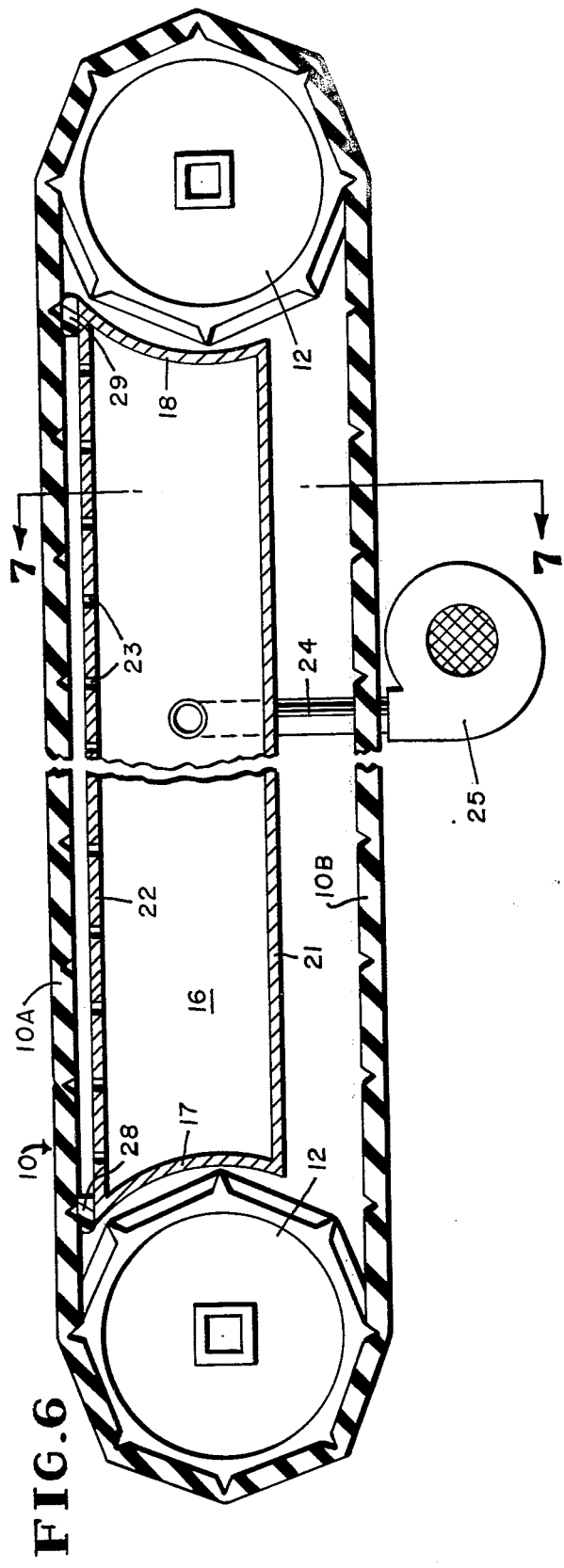
FIG. 6 is a longitudinal section taken on the line 6—6 in FIG. 8 showing the relation of the plenum chamber to the upper load carrying run of the conveyor belt.
Figure 7:
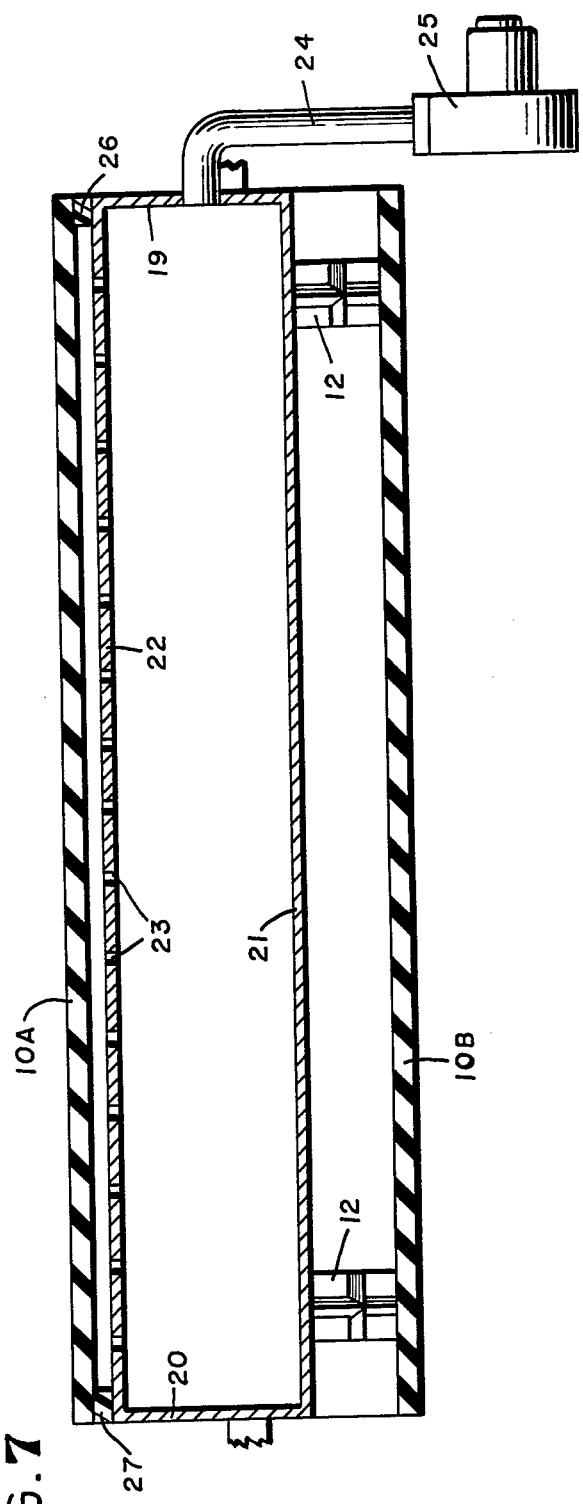
FIG. 7 is a transverse section taken on the line 7—7 in FIG. 6.

Referring now to FIGS. 6–8, the endless belt 10 is shown being supported and driven by sprockets 12 and defining a load bearing upper run 10A and a return run 10B. Beneath the upper run 10A of conveyor belt 10 is a plenum chamber 16, having curved end walls 17, 18, side walls 19, 20, a bottom 21, and a perforate top 22 having openings 23 therethrough. The side wall 19 has an air duct connection which supplies low pressure air through pipe 24 from a blower 25. Conveyor rails 26, 27 support the upper run 10A of belt 10 and air seals 28, 29 are at each end of the top 22.

The blower 25 supplies low pressure air 1 to 10 pounds pressure to the plenum chamber 16 and the air is directed upwardly through openings 23 which air levitates the conveyor belt run 10A when the belt is loaded and which reduces drag and friction between the underside of the upper run 10A and the support rails 26, 27. The rails 26, 27 may be of a material having a low coefficient of friction such a polyethelene when the belt 10 is of polypropylene.

What I claim is:

1. In combination a pair of drive sprockets having triangular spaced apart teeth extending axially of the sprocket about the circumference thereof and a polygonal aligning guide located substantially centrally of the sprocket, an endless food conveyor belt comprising an endless loop of polypropylene or polyethylene having integral hinge properties having an upper load supporting run and a lower return run, said loop having spaced areas of reduced thickness transversely of said belt defined by notches from the inside of the loop toward the outside adapted to mate with the triangular spaced apart teeth about the circumference of the sprocket, and said loop having a groove substantially centrally of the width of said loop adapted to be engaged by the triangular aligning guide located centrally of the sprocket, and air levitation means positioned below the upper load supporting run to reduce surface drag of the upper run of the conveyor comprising a plenum chamber having a perforate top below the upper run of the conveyor for directing a cushion of air from a low pressure source against the upper load supporting run of the conveyor.

* * * * *